United States Patent [19]

Kelson

[11] 4,154,109
[45] May 15, 1979

[54] MEASURING RECEPTACLES WITH REMOVABLE BOTTOM

[76] Inventor: Shirley J. P. Kelson, 9238 35th Ave. SW., Seattle, Wash. 98126

[21] Appl. No.: 910,438

[22] Filed: May 30, 1978

[51] Int. Cl.² ............................................. G01F 19/00
[52] U.S. Cl. ....................................... 73/429; 73/426; 222/469; 222/486
[58] Field of Search ......................... 73/429, 427, 426; 222/486, 483, 142.6, 144.5, 469, 561, 563

[56] References Cited

U.S. PATENT DOCUMENTS

| | | | |
|---|---|---|---|
| 93,231 | 8/1869 | Rosbeck | 73/429 |
| 659,146 | 10/1900 | Hayden | 73/429 |
| 686,807 | 11/1901 | Fry | 73/429 |
| 772,674 | 10/1904 | Rommer | 73/426 |
| 897,458 | 9/1908 | Dickeson | 73/429 |
| 2,420,505 | 5/1947 | Stith | 222/130 |
| 2,448,625 | 9/1948 | Ryther | 222/561 |
| 2,556,782 | 6/1951 | Venters | 73/426 |
| 2,781,955 | 2/1957 | Kidd | 222/561 |
| 3,393,794 | 7/1968 | Borin | 206/42 |

Primary Examiner—S. Clement Swisher
Assistant Examiner—Denis E. Corr
Attorney, Agent, or Firm—Graybeal, Barnard & Uhlir

[57] ABSTRACT

Measuring receptacle means comprising a plurality of cup members, each having an open top and bottom, with a removable bottom closure means in common with the cup members. Each cup member is of a different volume than the other cup members. Removable bottom plate means slidably closes the bottoms of the cup members such that the individual cup members are fillable with a measured material from the top when the bottom plate is in closure relation, and emptied from the bottom when the bottom plate is slidably removed.

22 Claims, 9 Drawing Figures

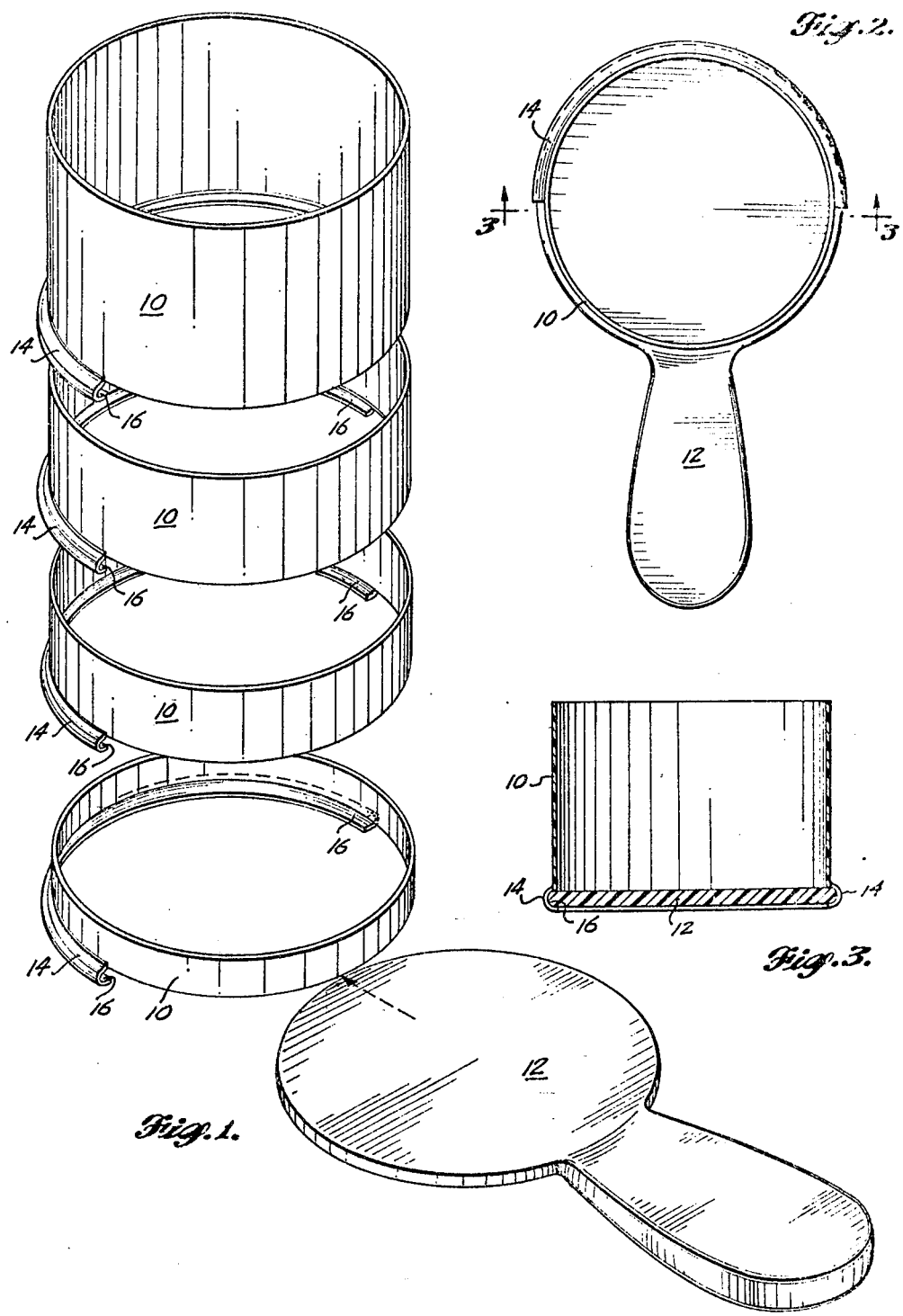

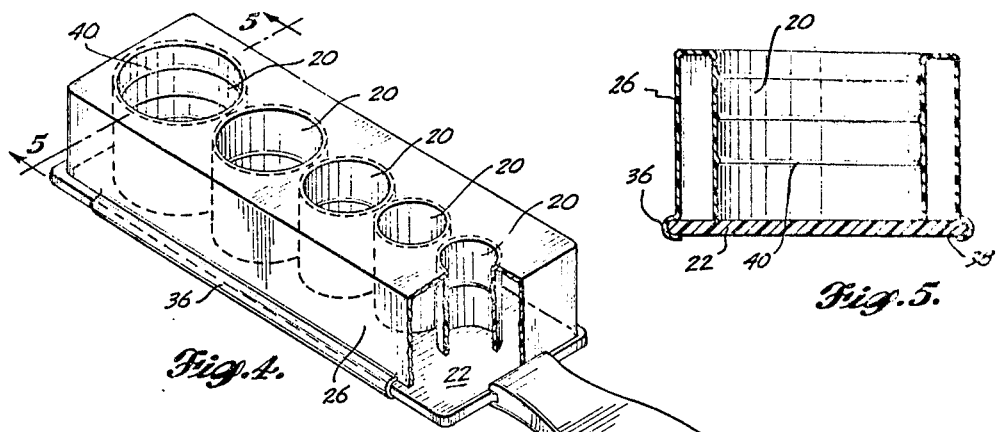
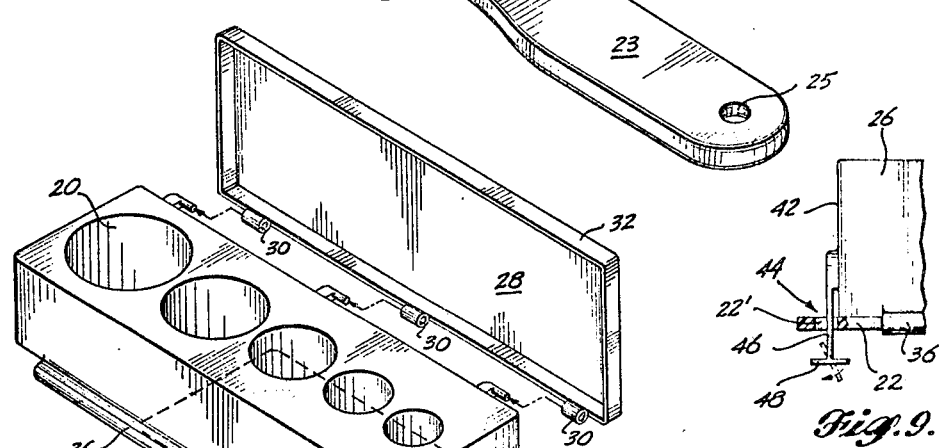
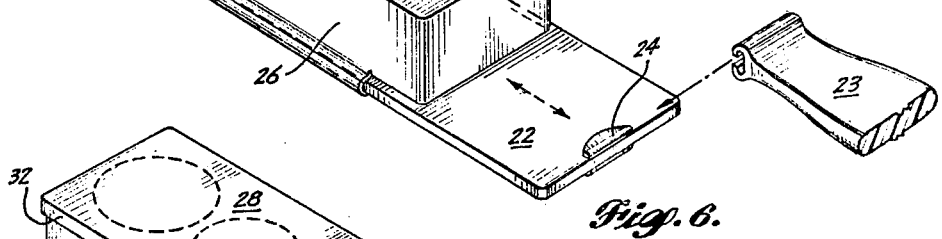

MEASURING RECEPTACLES WITH REMOVABLE BOTTOM

BACKGROUND OF THE INVENTION

1. Field of the Invention

This invention relates to measuring receptacles and more particularly to measuring receptacles of various volumes, each having cylindrical side walls with a common, removable bottom.

2. Description of the Prior Art

Typical conventional measuring receptacles consist of cup-shaped vessels having open tops and integrally closed bottoms. To provide a means to measure different volumes of a material to be measured, the vessels normally contain a plurality of graduation marks arranged in several rows and inscribed along the outside of the vessels, with the graduation marks indicating volumes in the metric system (milliliters) or English measuring system (cups and ounces).

A typical measuring operation involves inserting a material to be measured into the closed bottom of the cup from the top, tamping the material if necessary until it reaches a desired level as determined by the graduation mark, then discharging the material out the open top of the cup into a mixing bowl or the like, with scraping of the material from the cup if necessary. The integrally closed bottom configuration of the cup often results in appreciable amounts of the measured material being left in the bottom of a cup, with consequent measuring inaccuracies. In this regard, institutions such as hospitals or the like have spent considerable time and consumed substantial amounts of water washing and wiping these closed bottom cup measuring devices to remove this measured material.

The present invention overcomes these problems by providing a plurality of cup members, each having an open top and bottom, and each being closable at the bottom by a slidably removable bottom plate. In this manner a measured material may be emptied from the bottom of each of the cup members. In addition, each cup member has cylindrical, vertically straight side walls, thereby facilitating complete removal of a measured material from the cup member. By maintaining either the height or the diameter of all cup members equal, the volumes of the cup members may be selected such as to provide a standard set of measuring receptacles. Use of a measuring receptacle according to the present invention results in a very substantial savings in water due to the ready cleansability of the receptacle. Also, use of the measuring receptacle results in a saving of food, as one now may essentially completely remove all measured material from a given cup member simply by withdrawal of the bottom plate and by a sweep of a spatula, knife or the like around the vertical cylindrical walls of the cup members.

Fry, U.S. Pat. No. 686,070, discloses a measuring vessel with an open top and bottom but differs from the present invention in that Fry does not provide a slidably closable bottom nor a plurality of measuring vessels having various volumes therein. Rommer, U.S. Pat. No. 772,674, is directed to a scoop or ladle with an open top and bottom and which has a movable bottom for displacing the contents of the scoop out of top. Rommer also differs from the present invention in that Rommer does not provide a slidably closable bottom nor cup members having a plurality of volumes. Borin, U.S. Pat. No. 3,393,794, discloses a pill accounting dispenser covered by a transparent slide member, but differs from the present invention in that Borin provides a plurality of compartments having closed bottoms. Dickeson, U.S. Pat. No. 897,458, discloses a measuring device with a slide constituting an adjustable closure for the device. The measuring device in Dickeson differs from the present invention in that the measuring device has an integrally closed bottom.

SUMMARY OF THE INVENTION

According to one aspect of the present invention, the measuring receptacle comprises a plurality of open bottom cup members with each cup member having the same diameter as the other cup members. A removable bottom plate is used alternately and interchangeably with each cup member to slidably close the bottom thereof.

According to another aspect of the present invention, the measuring receptacle comprises a plurality of cup members with each cup member having the same height as the other cup members. The cup members are arranged adjacent each other integrally along a line such that a removable bottom plate slidably closes the bottom of each cup member.

It is a significant feature and advantage of the present invention that the measuring receptacle permits a measured material such as shortening or the like to be emptied directly into a mixing bowl or the like with minimal amounts of the measured material being left in the measuring receptacle.

A further advantage of the present invention is that the heretofore conventional procedure of first filling a closed bottom cup and removing the contents, then washing and wiping the cup before refilling with another material to be measured, is eliminated. With the measuring receptable of the present invention, the removable bottom plate is scraped essentially clean by withdrawal from its bottom closing position, and the cylindrical wall or walls of the receptacle are essentially rendered clean by simply scraping with a spatula, knife or the like, so that another material may be subsequently measured without the cup member being washed and wiped clean. This results in a substantial saving of time, effort and water.

A still further advantage of the present invention is that the space needed for storage of the measuring receptacle in a cupboard or the like is relatively minimal as compared with the space needed to store several separate closed bottom cups of various sizes.

A still further advantage of the measuring receptacle according to the present invention is that several of the cup members may be filled at one time, each with a different material to be measured and transported (with cover) from one place to another, such as from one home to another, so that the baking or the like may be readily done at another locality. Alternatively, the unit may be filled with various ingredients at a time when convenient, such as in the morning, and mixed later, such as in the afternoon.

A still further advantage of the present invention is that it may be conveniently and decoratively hung as a unit on a wall or the like such as by use of a hole within the removable bottom plate.

The foregoing and other objects, features and advantages of the present invention will become more apparent in light of the foregoing detailed description of preferred embodiments thereof, as illustrated in the accompanying drawings.

DESCRIPTION OF THE DRAWINGS

FIG. 1 is an exploded perspective view of one embodiment of a typical set of measuring receptacles according to one aspect of the present invention.

FIG. 2 is a top view of one embodiment of a typical measuring receptacle according to the present invention, showing the removable bottom plate in a closed relation with the bottom edge of a cup member.

FIG. 3 is a cross-sectional view of a typical measuring receptacle taken along lines 3—3 of FIG. 2.

FIG. 4 is a perspective sectional view of another embodiment of a typical measuring receptacle according to the present invention, showing a plurality of measuring cups arranged adjacent each other with the bottom plate closing the bottoms of each cup member.

FIG. 5 is a cross-sectional view of a typical measuring receptacle, taken along lines 5—5 of FIG. 4.

FIG. 6 is a perspective view of one embodiment of a typical measuring receptacle according to the present invention, showing a removable lid and a detachable bottom plate handle.

FIG. 7 is a perspective view of one embodiment of a typical measuring receptacle according to the present invention, showing another embodiment of a removable lid.

FIG. 8 is a cross-sectional view of a typical measuring receptacle taken along lines 8—8 of FIG. 7.

FIG. 9 is a detail, fragmentary view of the receptacle shown in FIG. 5, with a retainer element in place to lock the frame to the bottom plate.

DESCRIPTION OF THE PREFERRED EMBODIMENT

In one embodiment of the present invention, as shown in FIGS. 1-3, a typical measuring receptacle comprises a plurality of cup members 10 and a removable bottom plate 12 slidably closable at the bottom of each cup member 10. The bottom plate 12 is used alternately and interchangeably with each cup member to close the bottom thereof.

Each cup member 10 has an open top and an open bottom with a bottom plate retaining means 14 disposed circumferentially around a portion of its bottom. Bottom plate retaining means 14 is a half-rounded lip member with a groove 16 disposed circumferentially around the inside surface. Groove 16 is adapted to engage the edge portion of the removable bottom plate 12.

As shown in FIGS. 1-3, each cup member 10 has cylindrical side walls with each cup member having the same diameter as the other cup members. By maintaining the diameters of all cup members 10 equal, the height of each cup member may be varied to control the volume contained within the cup member. In this manner, it is possible to establish a standard volumetric size for each cup member. With reference to FIG. 1 and by way of a nonlimiting example, the lower cup member 10 may be sized in diameter and height to provide a 50 milliliter (ml) volume therein. Successive cup members may then be sized in height to provide 100, 150, and 250 ml volumes. By way of a further nonlimiting example, if it is desirable to measure 200 ml of a material, the bottom of 50 ml cup member 10 may be slidably closed by the bottom plate 12. The material to be measured may then be placed into the 50 ml cup member from the top, and when the measured material has reached the top surface of the 50 ml cup member, the removable bottom plate 12 may be slidably removed from the bottom of the 50 ml cup member thereby transferring the measured material into a mixing bowl or the like. The removable bottom plate 12 is then used to slidably close the bottom of the 150 ml cup member, and the process is repeated.

The cylindrical side walls of cup members 10 permit minimal amounts of a measured material from being left in the cup members when the removable bottom plate 12 is slidably removed. In addition, movement of the removable bottom plate 12 scrapes the measured material from the bottom portion of a cup member 10, thereby ensuring essentially complete removal of the measured material from the measuring receptacle.

The plurality of cup members 10 and bottom plate 12 may be constructed from any suitable material such as plastic, aluminum, stainless steel or the like. The removable bottom plate 12 can also be constructed of wood or the like.

A second embodiment of the measuring receptacle is shown in FIGS. 4-8, and comprises a plurality of cup members 20 contained within a frame 26. Cup members 20 have open tops and bottoms and are arranged adjacent each other along a line within the frame 26 such that the removable bottom plate 22 slidably engages the frame and slidably closes the bottoms of each cup member 20.

Frame 26 has a closing means 36 disposed at opposite sides of the frame member 26 along its bottom surface. Closing means 36 is essentially a half-rounded lip member with a groove 38 disposed along its inside surface. The groove 38 is adapted to engage a portion of the edge of the slidable bottom plate 22 thereby closing the bottoms of the cup members 20.

The slidable bottom plate 22 has a detachable handle 23 thereon. The groove and lip member 24 disposed upon bottom plate 22 to which the removable handle 23 is secured, provide a stop means to restrict the forward movement of the bottom plate 22 when it slidably engages the bottom of the frame 26 and slidably closes the bottoms of the cup members 20.

As shown in FIG. 4, each cup member 20 has cylindrical side walls with each cup member having the same height as the other cup members. By maintaining the height of all cup members 20 equal, the diameter of each cup member may be varied to control the volume contained within the cup member. As in the previous embodiment, it is possible to establish a standard volumetric size (either in English or metric units) for each cup member. With reference to FIG. 5, the cylindrical side walls of the cup members 20 contain a plurality of internal graduation marks 40 disposed circumferentially around the interior of the side wall of the cup members and axially above each other. The graduation marks may also be scaled in either English or metric measuring units or both and provide a means to finely measure the amount of material within the cup member and to convert English units to metric units; thus thirty milliliters are equivalent to two tablespoons, one fluid ounce is equivalent to 29.57 cubic centimeters or 28.35 grams dry measure.

Frame 26 has a lid 28 attachable thereto by a plurality of hinge means 30. Lid 28 has a lip 32 thereon such that when the lid 28 is disposed across the tops of cup members 20, lip 32 snugly engages the upper surface of frame 26 thereby securely attaching the lid 28 to the frame 26. As shown in FIG. 7, the lid 28 may also be securely attached to the frame 26 by a plurality of strap members 34 disposed on opposite sides of frame 28 with the strap members 34 being integral with the lip 32.

With the slidable bottom plate 22 in a closable engagement with the bottoms of the plurality of cup members 20, a material to be measured such as shortening or the like is placed into cup member 20 from the top. When the desired quantity of measured material has been placed in a cup member 20, the bottom plate 22 is slidably removed thereby transferring the measured material directly into a mixing bowl or the like with a minimal amount of the measured material being left in the cup member 20. Movement of the bottom plate 22 along the bottom of the frame member 26 scrapes the measured material from the bottom portion of the cup member 20, thereby facilitating removal of the measured material. In addition, with the cup member wall cylindrically configured, and with the bottom plate removed so that both ends of the cup member are open, any measured material left adhering to the wall, as may well be the case when the measured material is shortening or the like, can be readily removed as by scraping of the wall with a knife or the like.

FIG. 9 shows in fragmentary detail a suitable retainer element used to lock the frame 26 to the bottom plate 22 in forms of the unit adapted for wall hanging as by placing the hole 25 in handle 23 on a wall mounted nail or hook. When so hung, and to obviate any tendency of the frame 26 to slide off the plate 22, the end 42 of the frame 26 remote from the handle has attached thereto a flexible plastic retainer element generally indicated at 44 which includes a body portion 46 and a cross end 48. As will be understood, to place the retainer element in the locking position shown in FIG. 9, the flexible cross end 48 is flexed to be substantially parallel to body portion 46 and passed through a hole 22' near the corner of the plate 22, the cross end 48 returning to its unflexed position (as shown) when released from the thumb and fingers of the user. Then, when the user wishes to use the unit and slide the plate 22 from the frame 26, the body portion 46 and cross end 48 are pushed back through the plate hole 22' (the cross end 48 again being flexed parallel to the body portion 46 in the process), and the plate 22 is then free to be withdrawn from the frame 26 when desired.

It will be obvious to those skilled in the art to which this invention is addressed, that the invention may be used to advantage in any situation where it is necessary to quickly measure and transfer a quantity of a material into a mixing bowl or the like. Therefore, it is also to be understood by those skilled in the art that various changes, modifications, and omissions in form and detail may be made without departing from the spirit and scope of the present invention as defined by the following claims.

What is claimed:

1. Measuring receptacle means comprising:
   (a) a plurality of cup members with vertically straight side walls, each such member having an open top and bottom, with each cup member having a different volume than the other cup members;
   (b) a removable bottom plate placeable to slidably close the bottom of each said cup member so that each individual cup member may be filled with a measured material from the top when the bottom plate is in a closed relation and emptied from the bottom when the bottom plate is slidably removed therefrom; and
   (c) each such cup member further having associated therewith bottom plate retaining means in the form of half-rounded lip member means disposed around and beneath a portion of the bottom edge of the said walls of each cup member, said lip member means being spaced from the axial center of each cup member a radial distance at least as great as the radial distance of the cup member wall inner surface.

2. The measuring receptacle means of claim 1, wherein each cup member has the same diameter as the other cup members, and wherein said removable bottom plate is usable alternately and interchangeably with each cup member to slidably close the bottom thereof.

3. The measuring receptacle means of claim 1, wherein the removable bottom plate includes a handle means.

4. The measuring receptacle means of claim 1, wherein each cup member has a cylindrical side wall.

5. Receptacle means comprising:
   (a) a plurality of cup members each having an open top and bottom, with each cup member having a different volume than the other cup members; and,
   (b) a removable bottom plate slidably closing the bottom of each said cup member so that each individual cup member may be filled with a measured material from the top when the bottom plate is in a closed relation and emptied from the bottom when the bottom plate is slidably removed therefrom; each such cup member being of the same height as the other cup members, and said cup members being arranged adjacent each other along a line in a single assembly, such that the removable bottom plate slidably closes the bottoms of each cup member.

6. The measuring receptacle means of claim 5, wherein said removable bottom plate includes a handle thereon, said handle member being detachable from said bottom plate.

7. The measuring receptacle means of claim 5, further comprising a removable lid securable over the tops of said cup members.

8. The measuring receptacle means of claim 5, wherein the cup members have cylindrical side walls.

9. The measuring receptacle means of claim 8, wherein said side walls have a plurality of graduation marks disposed circumferentially within said side walls.

10. A measuring receptacle means comprising:
    (a) a plurality of separate generally cylindrical cup members of various volumes each having an inwardly facing grooved lip extending around substantially one-half of the bottom edge thereof and lying at a radial distance from the axial center of the cup member greater then that of the inner surface of the cup member; and,
    (b) a cup member closure means in the form of a removable bottom plate of a size to interfit with the said bottom edge grooved lip and close the bottom of said cup member when in such position.

11. The measuring receptacle means of claim 10, wherein the removable bottom plate includes handle means.

12. The measuring receptacle means of claim 10, wherein each cylindrical cup member has a vertically straight side wall inner surface lying in a surface of revolution about the axial center of the cup member to facilitate removal of measured material from said cup member by scraping of the wall inner surface as by a knife or the like.

13. The measuring receptacle means of claim 12, wherein the upper surface of said removable bottom plate is planar and extends outside of said surface of revolution when in engagement with said bottom edge groove.

14. A measuring receptacle means comprising:
(a) a plurality of cylindrical cup members of various volumes each having an open top and bottom and each being arranged substantially in a line in a unitary frame, having an inwardly facing grooved lip arranged along the lower side edges of said frame; and,
(b) a cup member closure means in the form of a removable bottom plate of a size to interfit with said grooved lip and being movable longitudinally along the bottom of said frame to close the bottoms of said cup members.

15. The measuring receptacle means of claim 14, wherein the removable bottom plate includes a handle means.

16. The measuring receptacle means of claim 15, wherein the handle means is removable.

17. The measuring receptacle means of claim 14, further comprising a removable lid securable over the tops of said cup members.

18. The measuring receptacle means of claim 14, further comprising a lid covering the tops of said cup members, said lid being lockable to said frame.

19. The measuring receptacle means of claim 14, further comprising a lid securable over the tops of said cup members, said lid being hinged to said frame.

20. The measuring receptacle means of claim 14, wherein each cylindrical cup member has a vertically straight side wall to facilitate removal of measured material from said cup member, in part by withdrawal of said bottom plate, and in part by scraping of the wall as by a knife or the like.

21. The measuring receptacle means of claim 20, wherein said vertically straight side walls include a plurality of graduation marks disposed circumferentially within said side walls.

22. The measuring receptacle means of claim 14, comprising means locking said bottom plate in cup member closing position on said frame.

* * * * *